US008473488B2

(12) United States Patent
Basner

(10) Patent No.: US 8,473,488 B2
(45) Date of Patent: Jun. 25, 2013

(54) VOICE OPERATED, MATRIX-CONNECTED, ARTIFICIALLY INTELLIGENT ADDRESS BOOK SYSTEM

(75) Inventor: Charles M. Basner, Lebanon, NJ (US)

(73) Assignee: Constad Transfer, LLC, Wilmington, DE (US)

( * ) Notice: Subject to any disclaimer, the term of this patent is extended or adjusted under 35 U.S.C. 154(b) by 129 days.

(21) Appl. No.: 13/107,641

(22) Filed: May 13, 2011

(65) Prior Publication Data

US 2011/0211677 A1  Sep. 1, 2011

Related U.S. Application Data

(63) Continuation of application No. 11/599,870, filed on Nov. 15, 2006, now Pat. No. 7,958,151, which is a continuation-in-part of application No. 11/440,837, filed on May 25, 2006, now Pat. No. 7,567,982.

(60) Provisional application No. 60/704,701, filed on Aug. 2, 2005.

(51) Int. Cl.
*G06F 17/30* (2006.01)

(52) U.S. Cl.
USPC .......................................................... 707/726

(58) Field of Classification Search
USPC .......... 707/1, 104.1, 726; 455/418; 379/88.18
See application file for complete search history.

(56) References Cited

U.S. PATENT DOCUMENTS

| | | | |
|---|---|---|---|
| 5,638,425 A | 6/1997 | Meador et al. | |
| 5,832,063 A | 11/1998 | Vysotsky et al. | |
| 5,905,775 A * | 5/1999 | Polcyn | 379/88.18 |
| 5,917,891 A | 6/1999 | Will | |
| 5,991,364 A | 11/1999 | McAllister et al. | |
| 6,049,594 A | 4/2000 | Furman et al. | |
| 6,269,369 B1 | 7/2001 | Robertson | |
| 6,349,299 B1 | 2/2002 | Spencer et al. | |
| 6,445,694 B1 | 9/2002 | Swartz | |
| 6,563,911 B2 | 5/2003 | Mahoney | |
| 6,671,354 B2 | 12/2003 | Mahoney | |
| 6,829,607 B1 | 12/2004 | Tafoya et al. | |
| 6,940,951 B2 | 9/2005 | Mahoney | |
| 7,373,142 B2 * | 5/2008 | Scott | 455/418 |
| 7,454,470 B1 | 11/2008 | Isaacs et al. | |
| 7,519,575 B1 | 4/2009 | Simpson et al. | |
| 7,594,011 B2 | 9/2009 | Chandra | |
| 2002/0087408 A1 | 7/2002 | Burnett | |
| 2002/0169751 A1 * | 11/2002 | Krass et al. | 707/1 |
| 2003/0014422 A1 | 1/2003 | Notargiacomo et al. | |
| 2004/0015586 A1 | 1/2004 | Hegli et al. | |

(Continued)

*Primary Examiner* — Etienne Leroux
(74) *Attorney, Agent, or Firm* — Dorsey & Whitney LLP

(57) ABSTRACT

An online address book system having sufficient hardware and software to operate an address book user interface and to perform intelligent interpretations of voice and text inputs from users. The system includes at least one server software module that includes software to perform a plurality of functions. These include the ability to receive voice input data and separate user voice queries, wherein the software can arrange the data so as to create a data base that includes at least three access dimensions, including contact access, contact-relationship access and contact-time frame access, and so as to create a connectivity matrix based on a plurality of contact pair relationships applying connective recognition logic. The system provides a voice operated user interface that permits access to address book stored data based on user input selected from the group consisting of contact, a contact-relationship pair, a contact-time frame pair, and combinations thereof.

23 Claims, 6 Drawing Sheets

U.S. PATENT DOCUMENTS

2004/0052356 A1    3/2004   McKinzie et al.
2004/0128322 A1*   7/2004   Nagy .......................... 707/104.1
2005/0066166 A1    3/2005   Chin et al.

* cited by examiner

VOICE OPERATED, MATRIX-CONNECTED, ARTIFICIALLY INTELLIGENT ADDRESS BOOK SYSTEM

REFERENCE TO RELATED PATENT APPLICATIONS

The present application is a continuation of U.S. application Ser. No. 11/599,870, filed Nov. 15, 2006, which is a continuation-in-part application of U.S. application Ser. No. 11/440,837, filed on May 25, 2006, U.S. Pat. No. 7,567,982, by the same inventor herein, entitled "Matrix-Connected, Artificially Intelligent Address Book System", which claims priority based on a U.S. Provisional Patent Application No. 60/704,701 filed on Aug. 2, 2005, by the same inventor as herein, and entitled "Super Index Card Address Book".

BACKGROUND OF INVENTION a. Field of Invention

The invention relates generally to computer-based address books and particularly Internet accessible address book systems that are voice operated. The present invention is primarily directed to an advanced address book system that includes software that operates more lie human thinking and offers additional features not heretofore offered by conventional computer-based address books. In particular, the present invention offers at least three dimensions or choices of queries, including a name search that includes comparative, connective and logic generated assistance for the user. The user makes the queries by voice and matches are-achieved through phoneme format comparisons.

b. Description of Related Art

The following patents are representative of advances in computerized address book system and/or multiple message transmission technology:

U.S. Pat. No. 6,940,951 B2 describes a speech enabled automatic name dialer dialing system for connection to a telephone system, that includes a user computer with a computer-based address book program for retrieval of name-telephone number data for creation of speech enabling phoneme sets for autodialing by speaking a name and utilizing telephone application programming interface (TAM) for use with user telephones connected to a PBX-type telephony mechanism. User computers have a microphone and speaker and contain at least one loaded address book program. There is software with access to the data base that creates name phonemes corresponding to the name-telephone number data; and software to access computer-based address book programs, to receive voice inputs from the telephony mechanism, to create converted phonemes from the spoken names to match voice inputs with specific name-telephone number data from the computer-based address book programs for initiating an automatic dialing.

U.S. Pat. No. 6,671,354 B2 describes a speech enabled automatic telephone dialer device that uses a spoken name Corresponding to name telephone number data. User telephones are connected to a public service telephony mechanism. The telephony mechanism and user computer work stations containing loaded address book programs with name-telephone number data, are connected to the name dialer device. The name dialer device includes a host computer in a network; a telephony board for controlling the telephony mechanism-for dialing; memory within the host computer for storing software and name-telephone number data; and, software to access computer-based address book programs, —to receive voice inputs form the telephony mechanism, to create converted phonemes from names to match voice inputs with specific name-telephone number data from the computer-based address book programs for initiating an automatic dialing. In other embodiments, there is no host computer or computer network, and a stand alone computer system with the aforesaid features is described.

U.S. Pat. No. 6,563,911 B2 describes a speech enabled automatic telephone dialer device, system, and method using a spoken name corresponding to name-telephone number data of computer-based address book programs. The invention includes user telephones connected to a PBX-type telephony mechanism, which is connected to a telephony board of a name dialer device. User computer workstations containing loaded address book programs with name-telephone number data are connected to the name dialer device. The name dialer device includes a host computer in a network; a telephony board for controlling the PBX for dialing; a memory within the host computer for storing software and name-telephone number data; and, software to access computer-based address book programs, to receive voice inputs from the PBX-type telephony mechanism, to create converted phonemes from names-to match voice inputs with specific name-telephone number data from the computer-based address book programs for initiating an automatic dialing.

U.S. Pat. No. 6,829,607 B1 describes a system and method that automatically provides dynamically generated completion information for facilitating user input of email addresses or contact information. This completion information is developed from a "data store" comprised of multiple data sources such as previously sent or received mail, and other types of electronic files such as word processor or spreadsheet files. The present invention monitors and uses the information in the-data store to automatically store, track, maintain, and organize data entries in a dynamic "resolution list". As a user begins to input an email address or contact, the present invention can either automatically complete the entry using a most probable result from the resolution list, or can display a list likely matches from which the user may select the desired email address or contact.

U.S. Pat. No. 6,445,694 B1 describes an Internet controlled telephony system employing a host services processor connected to subscriber via the Internet and further connected to the public switched telephone system (PSTN). The subscriber employs a web interface to populate a database with preference data which is used by the host services processor to handle incoming calls and establish outgoing telephone connections in accordance with the preference data provided by the subscriber. Incoming calls to a telephone number assigned to the subscriber may be automatically forwarded to ant telephone number specified by the preference data. The subscriber may also use the web interface to specify whether call waiting is to, be activated, to screen or reroute calls from designated numbers, for recording voice mail messages in designated voice mailboxes, for selectively playing back voice mail messages via the web interface or for forwarding voice mail as an email attachment, for handling incoming fax transmissions using character recognition and email attachment functions, and for automatically paging the subscriber when incoming voice mail, fax or email messages are received, all in accordance with the preference data supplied by the subscriber using the web interface. Outgoing connections and conference calls may be initiated using the web interface, and the subscriber may block the operation of caller identification functions. Call process information may be visually displayed to the subscriber during calls by transmitting web pages from the host services computer to the subscriber's web browser.

U.S. Pat. No. 6,349,299 B1 describes a system, method, and computer readable medium containing computer readable instructions for causing a computer to parse selected electronic contact information into fields of a record for storage in a contact database for use by an electronic address book program without opening the electronic address book module. The system may include a selection module that permits a user to select electronic contact information, an initiation module that enables a user to initiate parsing of the selected electronic contact information into fields of a record for storage in the contact database, a parsing module that parses the electronic contact information into fields of a record in a format for storage in the contact database, and a storage module that stores a record from the fields assigned by the parsing module in the contact database. The selection module and the initiation module may operate through operation of a select and click combination through use of a computer mouse and selection of a computer screen icon presented to the user by the system.

U.S. Pat. No. 6,269,369 B1 describes a network-computer-based personal contact manager system wherein users of networked clients maintain and update a set of user information which is stored in a relational database on a networked server. The personal contact manager system allows each user to specify on an individual basis which of their contacts are permitted to access, respective datums of their user information. In some cases, and assuming permission is granted, the system will issue notifications (e.g., y e-mail) to a user's contacts when the user changes his information or when a preset event, such as a birthday, as defined by the user is to Occur. The system also allows users to find contacts based on common group affiliations and notifies users when there are coincidences in their data (e.g., travel plans, astrological compatibility). The personal contact manager system supports the retrieval of information on the contacts of contacts, assuming such as permission has been granted by the contacts and their contacts, and can also be used to synchronize the server database with a PIM database of the user and any contacts of the user who have the appropriate permissions.

U.S. Pat. No. 6,049,594 describes a technique for creating, training, and using a telecommunication network-based automatic voice-dialing system through the automatic determination, by a network element, of Rely called parties for a given customer. This determination is made based on records of network usage by the customer. Names of the likely called parties are determined through the use of e.g., a conventional reverse telephone directory database.

U.S. Pat. No. 5,991,364 describes a telephone communications system Advanced Intelligent Network (AIN) platform that provides a voice activated call dialing functionality through speaker independent phoneme speech recognition having a minimum volume of storage without requiring user template training. Speaker independent phoneme recognition identifies phoneme strings of caller spoken utterances which are compared to phoneme string representations that previously have been stored in respective caller processing records (CPRS) for those subscribers listed in the ISCP database, or stored in an equivalent peripheral database with which the ISCP can communicate. Each stored phoneme string representation is associated in the CPR with a destination telephone number that may be extracted to route a call.

U.S. Pat. No. 5,917,891 describes a method and apparatus for assisting voice-dialing using a model of an individual's calling behavior to improve recognition of an input name corresponding a desired telephone number. When the individual picks up u telephone, activity is initiated in & neutral network model of the individual's calling behavior that predicts the likelihood that different numbers will be called, given such predictors as the day of the week and the time of day. The model is constructed by training the neutral network with data form the user's history of Making and receiving telephone calls. The auditory output form an automatic speech recognition system and the output from the user model are integrated together so as to select the number that is most rely to be the number desired by the speaker. The system can also provide automatic directory assistance, by speaking the number aloud rather than dialing it. In one version, the system is a personal directory for an individual maintained on that individual's personal computer. In another version, the system serves as a directory for a given physical or virtual site, with information about the institutional organization at the site in addition to individual calling histories used to track calling patterns and make predictions about the likelihood of calls within the site.

U.S. Pat. No. 5,832,063 describes methods and apparatus for activating telephone services in response to speech. A directory including names is maintained for each customer. A speaker dependent speech template and a telephone number for each name, is maintained as part of each customer's directory. Speaker independent speech templates are used for recognizing commands. The present invention has the advantage, of permitting a customer to place a call by speaking a person's name which serves as a destination identifier without having speak an additional command or steering work to place the call. This achieved by treating the receipt of a spoken name in the absence of a command as an implicit command to place a call. Explicit speaker independent commands are used to invoke features or services other than call placement. Speaker independent and speaker dependant speech recognition are preformed on a customer's speech in parallel. An arbiter is used to decide which function or service should be performed when an apparent conflict arises as a result of both the speaker dependent and speaker independent speech recognition step outputs. Stochastic grammars, work spotting and/or out-of vocabulary rejection are used as part of the speech recognition process to provide a user friendly interface which permits the use of spontaneous speech. Voice verification is performed on a selective basis where security is of concern.

Notwithstanding the prior art, the present invention is neither taught nor rendered obvious thereby.

SUMMARY OF INVENTION

The present invention solves the problems and overcomes the drawbacks and deficiencies of prior art computer-based or Internet-based address books, by providing a matrix of resources for accessing contact information, by providing time-based alternatives and by growing and connecting (artificial intelligence) relationship information and historical usage to refine responses to user queries and inputs.

The present invention online address book system has sufficient hardware and software to operate an address book user interface and to perform intelligent interpretations of inputs from users. The system includes at least one server software module that includes software to perform a plurality of functions. These include:

a.) receive and store address book input data into a stored database, including unlimited names, With addresses, phone numbers and/or email addresses, for each contact record in the database;

b.) receive and store relationship input data based on contact pair relationship inputs;

c.) receive and store time frame input data based on contact-time frame inputs;

d.) create the data in phoneme format so as be utilized for matching converted user voice inputs;

e.) arrange the data so as to create a data base that includes at least three access dimensions, including contact access, contact-relationship access and contact-time frame access, and so as to create a connectivity matrix based on a plurality of contact pair relationships applying connective recognition logic;

f.) provide a user interface that permits access to address book stored data based on said user voice input selected from the group consisting of contact, a contact-relationship pair, a contact-time frame pair, and combinations thereof wherein said user voice inputs are converted to phoneme format and are then matched to said data base for matched response to said user voice inputs.

In some preferred embodiments, the online address book system software creates a connectivity matrix by operation of a subsystem that includes a plurality of familial relationship definitions and includes deductive logic to arrive at conclusions by matching contact-relationship inputs to familial relationship definitions and generating additional contact relationship pairs therefrom. In other words, the software infers the relationship between Person A and Person C if 1) there is a Person B, and 2) the relationship between Person A and Person It is inputted, and 3) the relationship between Person B and Person C is inputted, and 4) there are corresponding familial relationship definitions to which deductive logic is applied. The term "familial" as used herein means of or relating to the family, and the term "*pity" should be broadly interpreted to include a family of people of common interest, e.g., blood and marital relatives, employees of a company, members of an organization, etc.

In addition to the foregoing, some preferred embodiment online address book system software includes an intelligent interpretation feature wherein query information is stored, matched, and prioritized by a plurality of criteria including phoneme similarity and frequency of usage, to set response priorities for subsequent queries. Also, in some present invention embodiments, the online address book system software includes a phoneme feature that matches inputted query words to at least one of a) existing database words, b) equivalent words (due to transliteration differences), c) standard phoneme-based abbreviations (like "DU" for "Richard"), d) standard pre-assigned connected abbreviations; and e) custom abbreviations (like "Junior" for a son) and, when a match fails, finds the closest phoneme and queries back if more than one potential match is found. The preferred sequence is that the software first attempts to match a query to a contact record and to provide the information sought by the user. If this fails, then the software assumes a phoneme conversion or spoken word error has occurred and finds the Closest phoneme, and offers the contact record information to the user. If more than one possible phoneme comes into play from the database, the software is programmed to offer the user a choice to select the desired contact, and after the user makes a choice, the contact record. information is presented. Other alternative sequencing fray occur. For example, the related phoneme feature itself could occur as an option to the user, and it could be turned on to an automatic feature, turned off or offered as a manual choice to be made at the time of use.

In another preferred embodiment feature, there is an automatic category creation by the software in response to recognizable input information. This software may include an automatic category creation capability based on preprogrammed category term matches with inputted contact information. If a military title or professional title or other commonality is inputted with other contact information, an autocategory feature will create a category for the user, e.g., listing all doctors together, listing all professors together, listing all military personnel together, listing all contacts with the same last name together (perhaps a family list or clients from the same family list), etc.

Also, in some present invention embodiments, the online address book system software includes user customized category creation so that input data for a contact may be placed in a data subset by user-selected category. These categories may be selected from a list of preset choices, or the user may create a category, or both. In some preferred embodiments, the user customized category creation includes user ability to create as many categories as desired and to place contact information data into as many categories as desired, to subsequently access the data by category by voice operation.

Further, in some present invention embodiments, the online address book system software includes an historical context feature that alters priority response to queries based on historical performance. For example, the softy/are considers a contact record that has been accessed frequently to be a more likely match than one that has been accessed infrequently; also, a contact record with a close relationship to a frequently accessed contact record is accorded to a higher priority than a record without such a relationship (e.g., frequent searches for John Doe inform the software that a search for "Jane" is likely to be a search for John Doe's wife, Jane).

Also, in some present invention embodiments, the online address book system software may include an automatic word or phrase completion to assist a user when inputting a query.

Additionally, in some present invention embodiments, the online address book system software may include contact-time frame input linking to a primary contact data set and will create temporary or permanent override query responses made within override time frames. The term "time frame" as used herein means any word or phrase which describes or implies a particular time period, and should be broadly interpreted to include a) traditional time measures (10:00 am Wednesday, 2006, yesterday, etc.), b) repeating time references (every summer, every other Tuesday, etc.), c) references to standard events which themselves define a time period ("next semester", "the holidays", "when the leaves turn", "when we first met", etc.).

In addition to the features set forth above, in some present invention embodiments, the software includes a security software module. It is preferred that the security software module has at least two levels of secure access, including a Level One Access that includes full access to use and read contact data, to input contact data, to change data and to delete contact data, and including a Level Two Access that includes preset limited access to use and read contact data, to input contact data, to change data and to delete contact data. Additional variations on security are also possible and a primary user could 'set different levels of security for different subusers, e.g., children, with restrictive password/designated computer-based security levels.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding, of the invention and are incorporated in and constitute a part of this specification, illustrate preferred embodiments of the invention and together-with the detailed description serve to explain the principles of the invention. In the drawings:

FIGS. 3, 5 and 6 illustrate additional feature of the present invention address book system;

FIGS. 3 and 5 illustrate block diagrams of the FIG. 1 present invention preferred embodiment, with additional features and options;

FIGS. 4 and 6 illustrate block diagrams of the FIG. 1 present invention preferred embodiment, with additional features and options;

DETAILED DESCRIPTION OF THE EMBODIMENTS

Figure 1:
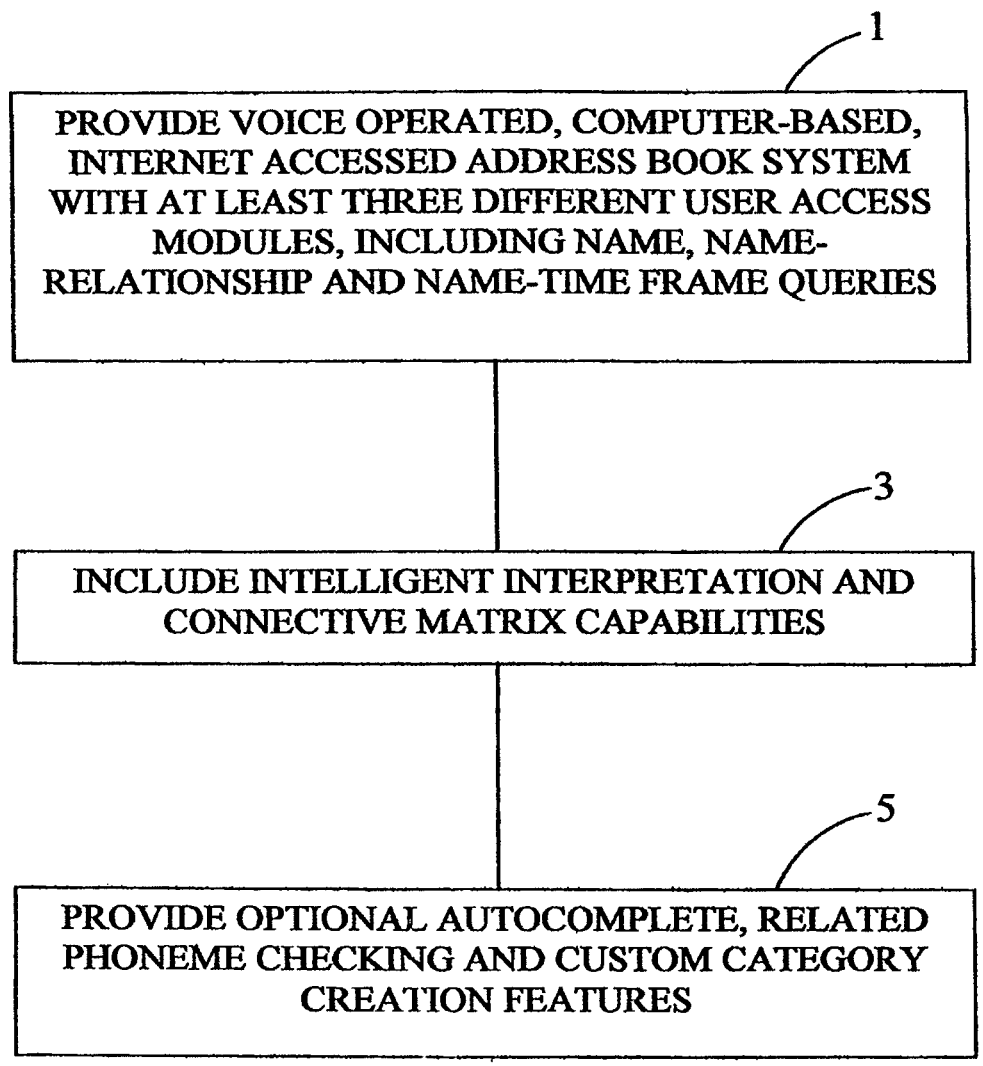
FIG. 1 is a block diagram of one preferred embodiment of the present invention address book system.
Figure 2:
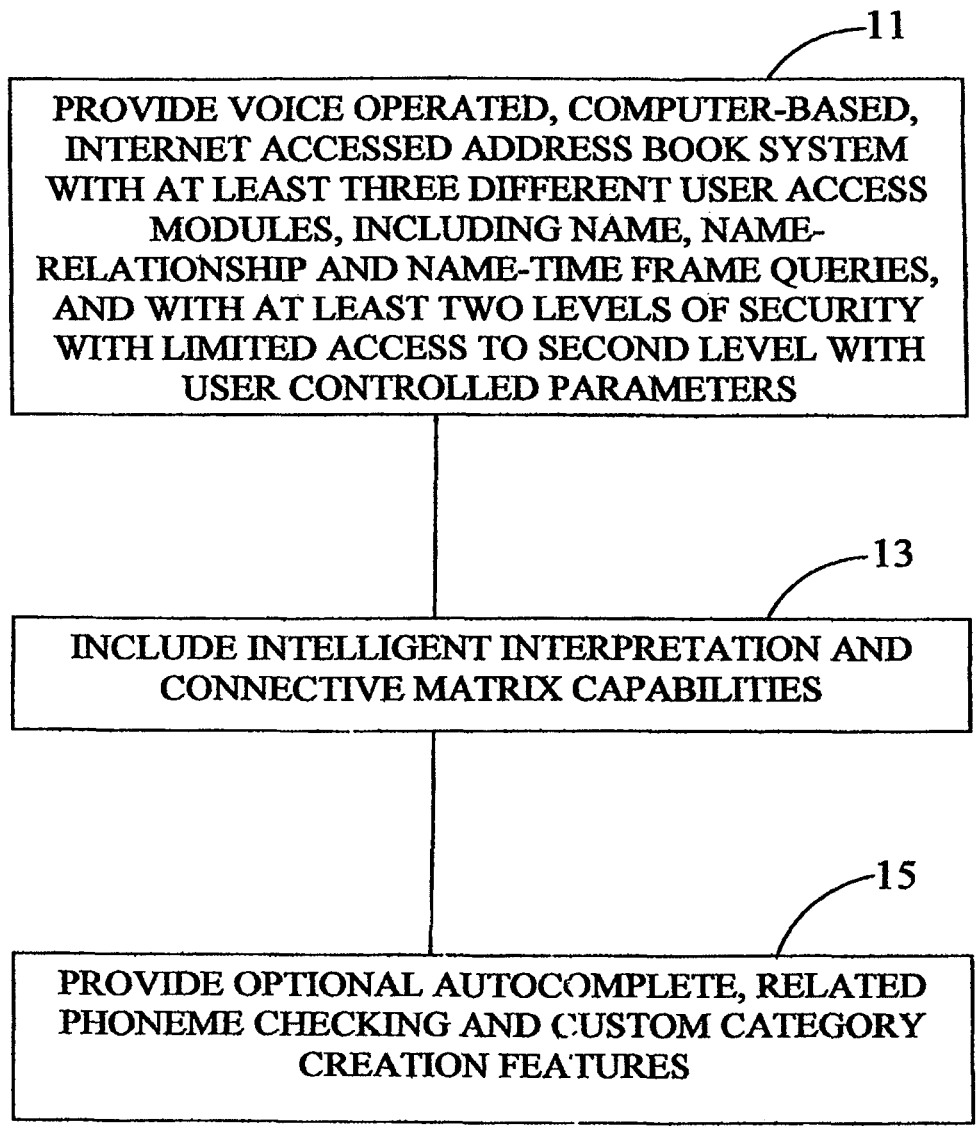
FIGS. 2 and 3, are a block diagrams of other preferred embodiments of the present invention address book system.

Referring now to the drawings, FIG. 1 is a block, diagram of one preferred embodiment of the present invention address book ("AB") system wherein block 1 shows the basic features of the present invention AB with at least three dimensions of accessibility for users. Block 3 shows the essential intelligent interpretation and connective matrix features and block 5 illustrates some optional but preferred additional features. FIG. 2 is a block diagram of another preferred embodiment of the present invention address book system wherein block 11 shows the basic features of the present invention AB with at least three dimensions of accessibility for users and at least two levels of user security. Block 13, as does block 3 above, shows the essential intelligent interpretation and connective matrix features and block 15, as does block 5 above, illustrates some optional but preferred additional features.

Figure 3:
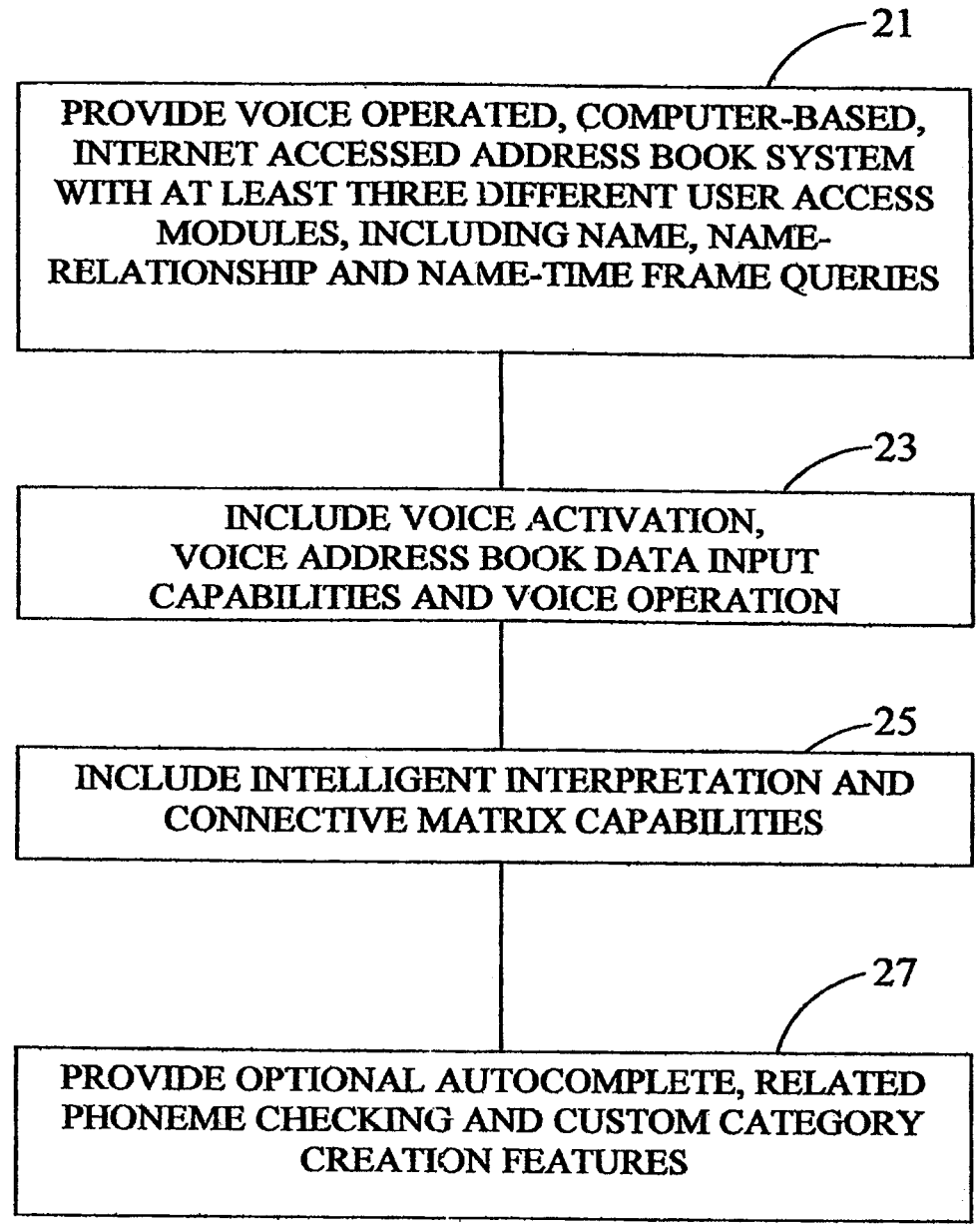
Figure 4:
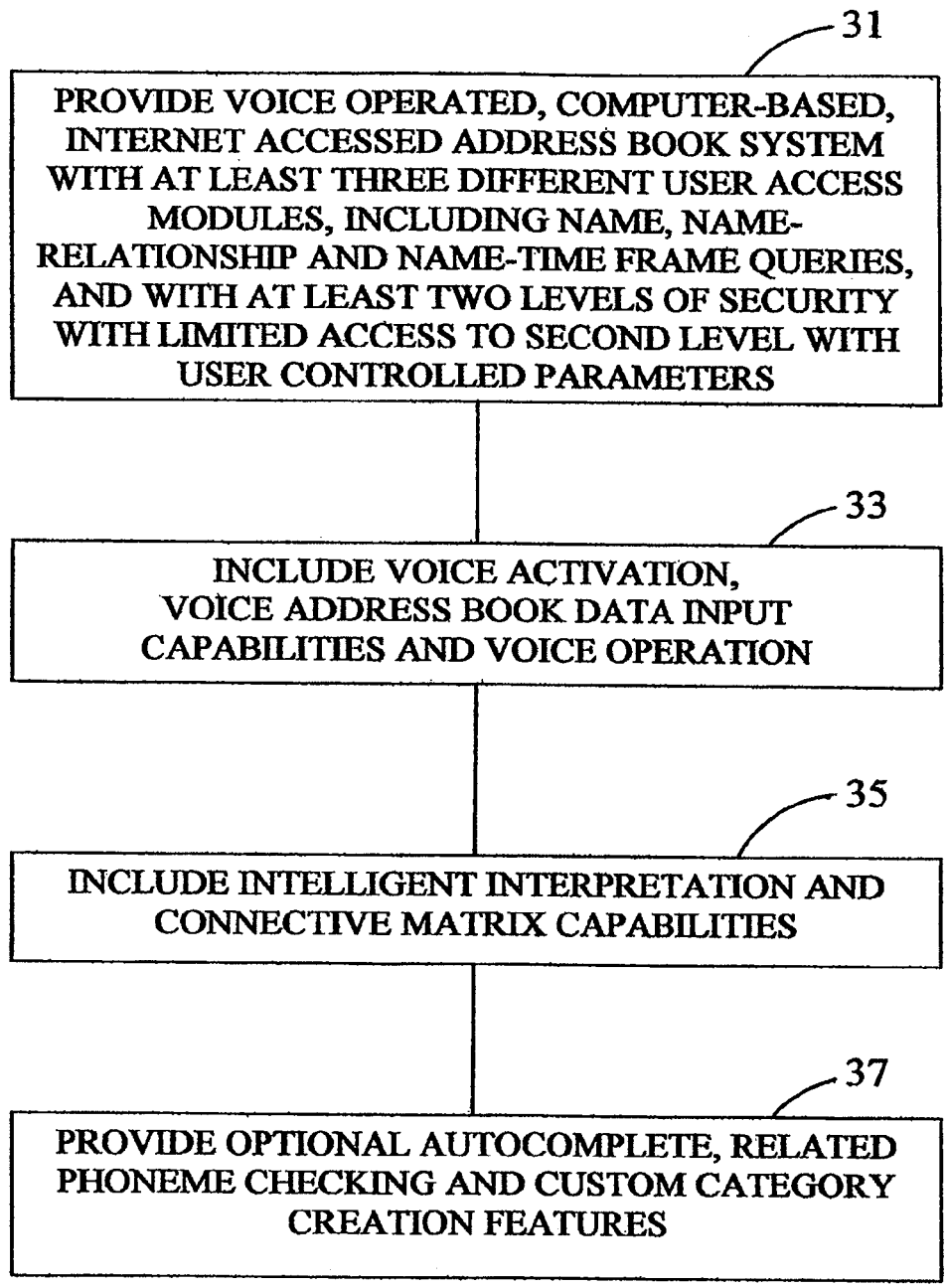

FIG. 3 is a block diagram of the preferred embodiment of the present invention address book ("AB") system shown in FIG. 1, but with additional features. Block 21 shows the basic features of the present invention AB with at least three dimensions of accessibility for users. Block 23 illustrates including not only voice operation (i.e. saying the contact information to retrieve relevant AB data), but also voice activation- and voice input of the stored AB data. Block 25 shows the essential intelligent interpretation and connective matrix features and block 27 illustrates some optional but preferred additional features. FIG. 4 is a block diagram of the preferred embodiment of the present invention address book system shown in FIG. 2 but with additional features. Block 31 shows the basic features of the present invention AB with at least three dimensions of accessibility for users and at least two levels of user security. Block 33 shows the additional voice-based functionalities. Block 35 shows the essential intelligent interpretation and connective matrix features and block 37 illustrates some optional but preferred additional features described above and below.

Figure 5:
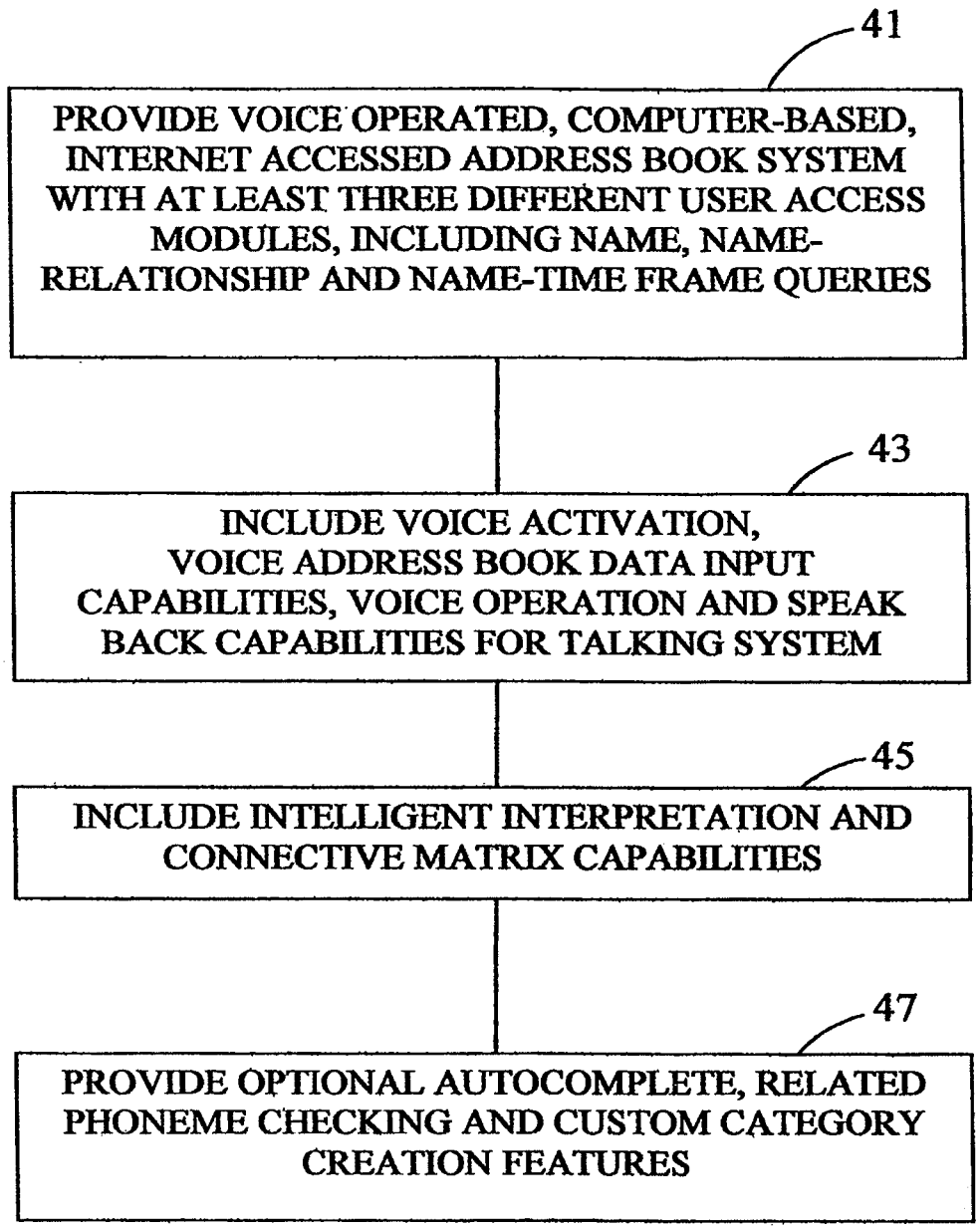
Figure 6:
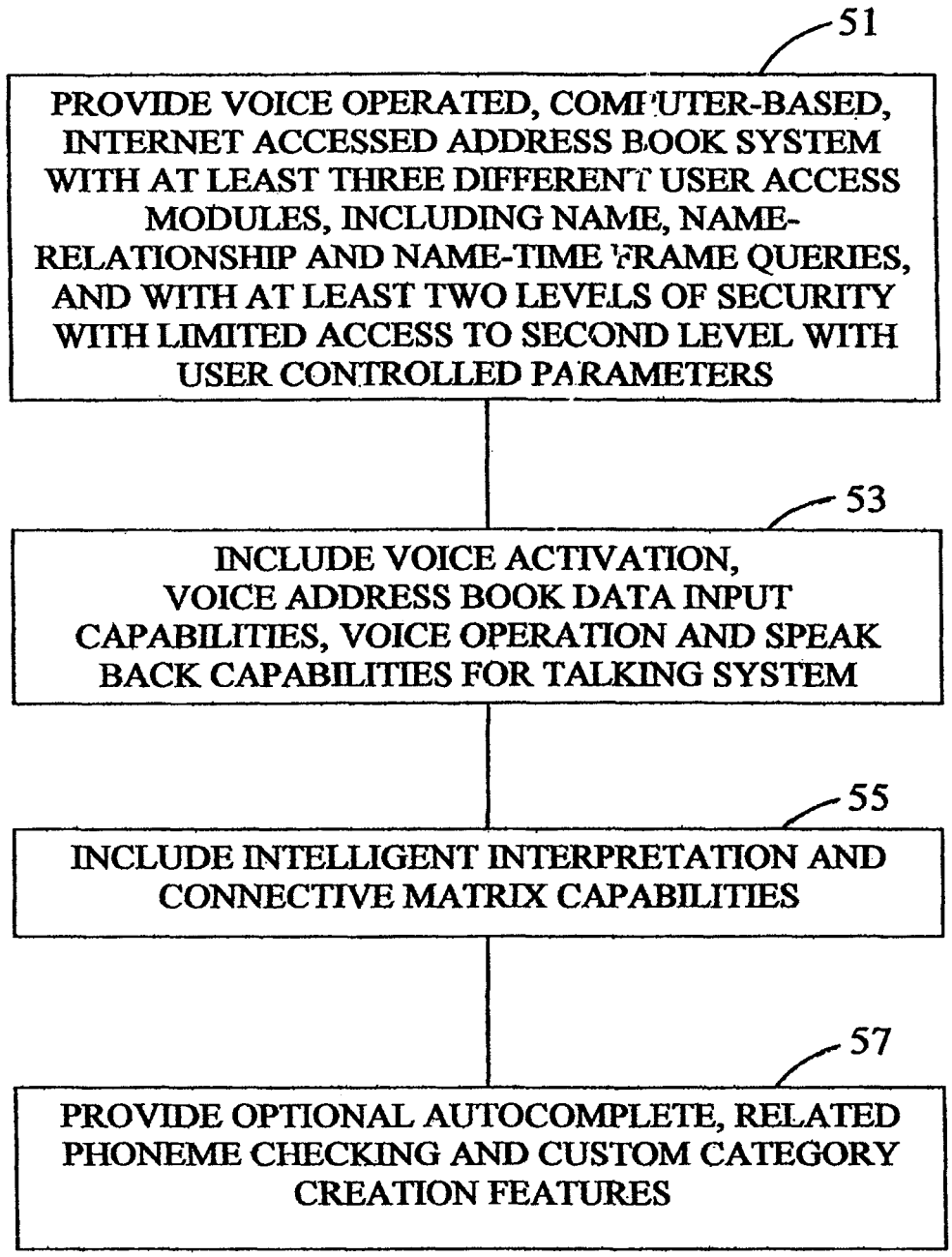

FIG. 5 is a block diagram of the preferred embodiment of the present invention address book ("AB") system shown in FIG. 1, but with additional features. Block 41 shows the basic features of the present invention AB with at least three dimensions of accessibility for users. Block 43 illustrates including not only voice operation (i.e. saying the contact information to retrieve relevant AB data), but also voice activation and voice input of the stored AB data, and speaking capabilities, such that the system will talk back to the user in providing query responses. Block 45 shows the intelligent interpretation and connective matrix features and block 47 illustrates some but preferred optional features. FIG. 6 is a block diagram of the preferred embodiment of the present invention address book system shown in FIG. 2 but with additional features. Block 5.1 shows the basic features of the present invention AB with at least three dimensions of accessibility for users and at least two levels of user security. Block 53 shows the additional voice-based functionalities including the speak-back capabilities described above. Block 55 shows the essential intelligent interpretation and connective matrix features and block 57 illustrates 'some optional but preferred additional features described above and below.

The present invention is a software address book system that provides voice access both via a designated source, e.g. a home computer network, an office computer or a collection of Level One computers, as well as via voice remote access, e.g., any wired communication or wireless communication system or device, such as a phone, or cell phone or PDA, Internet resource, or other Level Two access, with some functionality deliberately disabled during this Level Two remote access. There is a user interface that can be either a browser or a Java-based program, or both. The Java program gives the user much more power to manipulate the contact information, but the browser approach is well within the scope of the present invention and sufficient for critical basic tasks of the present invention.

The following term definitions shall apply when the terms are used herein:

The term "contact" means a person whose information is captured in AB; "contact record" is the content and location where AB stores all the information about a contact. The term "address" means all contact information for a person, including but not limited to:

Street/city/state address (like 501 N. Main St, Chatham N.J. 07803)
Email address (like joesmith@abc.com)
Phone number (like (908) 908-9080)
Name (A single contact could have a set of names, i.e., two or more names, such as a pen name or a stage name, and a legal name; a formal name and a nickname; a married woman might have two names, retaining her maiden name for business purposes, etc., and any name from the set could be used to subsequently access the contact record.)

In its preferred embodiments, the AB presents itself as a seamless voice activated voice responsive system that accepts streams of audio input and then assimilates and acts upon and response to the audio inputs. This enables the simplest approach as presented to the user, yet offers tremendous depth and breadth of operation internally. All access to the address book database can be accomplished with basic commands, or transactions. This unique methodology acknowledges the way people usually think when using an address book. For example, if a user wants Joe Smith's phone number, she just says "Joe Smith." Traditional address book software requires the user to navigate to a particular section of the database (in this case either the "J"s or the "S"s, depending upon whether the address book is sorted by first name or last) and then scan through a section of alphabetically sorted names until she finds the desired one. AB does that work for the user, showing the user a list only if it is unable to determine whom the user intended to find.

It is acknowledged that some traditional address books have "Find" or "Search" mode, and AB's interface could be considered simply permanent "Find" mode. However, AB's command line is neither an afterthought nor an additional tool—it is the primary interface and it is intelligent. Thus, it supersedes a mere permanent mode of the prior art existing rigid-by-the rules search mode. It learns from usage to refine its own capabilities, it learns from various inputs coupled with conclusive usages, it learns from frequency of user inputs to prioritize and it learns from relationships to connect contacts to create an ever-growing matrix of connections. Thus, it has many features, among them:

| | |
|---|---|
| Intelligent Interpretation | Every command input is analyzed and remembered, not just discarded after use like a traditional search command. If a voice command contains previously unknown information, then AB saves that information, either by storing it in a particular record (for future retrieval or as a means of speeding up future searches), or by storing it in a user profile to allow the program to better predict your intentions in the future. Your command might contain indirect qualifying information; for example, if you say "Joe's son" then the program will not consider any "Joe" who is not old enough to have a son-similarly it won't consider anyone named "Joe" who you know only because they work at retail stores you do business with, since it is unlikely you would even know whether they have a son or not. |
| Related Phoneme Checking | Traditionally, address book software doesn't do checking because names are often stored creatively and a program should not second-guess a user's input. However, this should not apply to searching, so AB will check your voice search input phonemes against your address book data. For example, if you say "Joe Lie" and your data contains a person named "Joseph Lee", AB will suggest, "did you mean". Thus, the AB software will recognize partial phoneme matches and similar phonemes. Plus, AB will remember that you said his name, differently from the stored data and take that into account for future searches. |
| Historical Context | AB uses its log of all transactions to narrow down your search. If you recently searched for "Joe Smith" and then search for "Joe", Joe Smith tops the list of possible matches (or, if you're "feeling lucky", Joe Smith will be shown right away). This mimics real life: you don't have to think about your old college roommate Joe Smith each time you look up your current doctor Joe Smith's telephone number. |
| Categories | The phone book software allows you to assign a category to a person; AB allows for an infinite number of categories, and allows you to search within them effortlessly. If you have assigned Joe Smith the category "Doctor", "Doc Joe" retrieves him instantly. If you hadn't ever categorized him as a doctor but search for him with "Doc Joe", he is automatically assigned that category when you find him. |
| Nicknames | Every entry in AB can have an unlimited number of aliases, nicknames, abbreviations, etc. For example, "Doctor" is automatically understood as "Doc", as is "Bill" Bar "William", and the like. Additionally you can manually assign nicknames, like "JS" (for Joe Smith) or "Bubba". This process is simple-if you start a search for someone by saying "JS", when you finally select the correct corresponding entry AB will assign that nickname to that person, enabling you to say "JS" the next time and immediately retrieve the right record. |
| Ask questions to narrow down possible choices | If AB detects a lot of matching records, it can ask you questions to winnow down the results. To do this it looks at similar data in the matching records and asks you to select among that data to limit the possible choices. For example, if you say "Joe" and there are 30 possible matches, AB might ask you "Is Joe A) family, B) work related, C) a friend, or D) none of those?' Depending upon your answer there may be only one qualifying Joe, or there may be a few, but there will certainly be fewer than 30 for you to look through. |
| Autocomplete | AB will suggest completions for words or phrases it knows, so if you start saying "Worthington", by the time you've said "Worth" AB may let you choose Worthington from a list. |
| Connective Relationships | AB will establish connective relationships from inputs coupled with pre-existing connective relationship definitions. |
| Matrix Expansion | AB will evolve the connective relationships by application of logic to create additional connective relationships. |
| Security | AB may include at least Two Levels of security so that the creation, change or deletion of a contact record can only occur from designated site(s) and password(s). |
| Alternative media Integration | AB will integrate and function with other systems, such as cell phones, email, word programs, handheld hardware devices, etc. for capture, release or coordination to offer additional functionalities. |

A Second Dimension

Structure

A conventional address book database record is a one-dimensional snapshot of a person, capturing information about him or her and saving it in a preset way by rigid rules. This snapshot of information is inserted into fixed fields and is merely stored information, no different from a typed word processing document, but worse because of the narrowness of movement and space and other limitations inherent in a typical address book program (very much like one hundred years ago when we filled out only set data on a 3×5 index card or other card, and stored it alphabetically, e.g. a "Rolodex System"). But in real life, a person's contact information contains many structures that enable human beings to recall that information very quickly.

For example, consider a user of AB named Tom Jones. His mother's name is Sarah and her sister's name is Hannah. The underlying structure of these three contacts is their family relationship, which enables the artificial intelligence of the system to immediately retrieve the correct record (Hannah) when Tom says "my aunt."

The AB software understands family relationships just this way, so that when Tom logs into AB, it knows to whom "my aunt" (or, with related phoneme checking, "my ant") refers. If Hannah has a son Max, Tom can add him to AB with the command "add Hannah son Max" and then retrieve Max's record with "my cousin". Family relationship is just one type of structure that AB understands; there are others, like work relationships (e.g., boss, employee, etc.), professional relationships (e.g., doctor, referral, practice, etc.), and custom relationships that users can define on their own.

In the present invention AB system, relationships link a user's contacts to each other. Thus, in some of the preferred embodiments of the present invention, there is sufficient software to provide the user with, inter alia, the following capabilities: One can see the contact relationships either by listing all linked contacts together (say, by displaying all the people who work someplace), or graphically (say, by displaying a family tree). One can also use relationships to share information across records; for example, linked family members or linked doctors in a practice might share one or more addresses. This can be especially beneficial in simulcasting messages, e.g., when linked with email transmittals.

A Third Dimension

Time

Traditional address book software captures a limited number of addresses for any given contact and categorizes them (e.g., "home" or "work"). In AB, each person can have unlimited addresses that are categorized not only by name, but also by time. That is, each address can be associated with a particular time: a time of day (like 9 am to 5 pm), a time of the year (like summer), a recurring time (every Wednesday), an event whose time is defined (like spring semester), or even a time in the past (last year).

Again, AB mimics human behavior. When a person thinks of calling Joe Smith, he considers the day and time—depending upon Joe's work hours and the time one would first try to call him either at work or at home. One can enter this information into AB for Joe and when it displays his record his matching location according to the time will be shown first. This enables AB to store information that won't easily fit in other address book software:

| | |
|---|---|
| Travel Itinerary | Store the addresses or locations of the person along with the time they are expected to be there. When that time is past the information will no longer be displayed (unless you wish to recreate their itinerary for reference purposes). This could be summer travel, business travel, vacation travel, etc. |
| Non-standard Living Arrangement (say, a child whose parents have divorced where the child spends different days with a different parent) | In the child's record enter the parent and the days of the week (or Living Arrangement alternate weeks, or whatever arrangement they have) that he or she (say, a child whose is with that parent. For example, "M-F mom, S-S dad, xmas dad, thanksgiving mom". |
| Vacation Home | If someone lives at different homes different times of the year, enter all the addresses and specify when the person is normally at each location. |

AB presents itself as a single input field into which the user enters all queries and information by voice. In some preferred embodiments, it uses this same input field in order to identify and validate the identity of the user (instead of the more usual user id and password fields that most computer software uses for this purpose). To start accessing their own personal database, a user would identify himself by voice in this input field as "I am Joe Smith", and AB would respond by validating his identity, asking him to answer a personal question randomly selected from the personal data he has already entered into his database. The user can combine this identification with a request for data (e.g., "I Joe Smith, mom" would identify the user and request his mother's contact record; before displaying it, AB would challenge the user to enter a random piece of personal information that confirms his or her identity). This eliminates the need for the user to assign and remember a single password (which could be stolen, compromising his data), and reduces the amount of interaction necessary to access his data. An incorrect response to the challenge question results in a much more stringent identification process; this scenario reduces the possibility that someone else will attempt to access other users' data, since the would-be wrongdoer won't know the answers to all of the possible questions and any wrong answer will result in even more difficult questions and access.

The voice recognition aspects of the software may be any available or known system. Voice recognition is achieved in the present invention by a voice input means, i.e. spoken word into a receiver, such as a headset or microphone, for conversion into phonemes. Thus, the analog voice signals are converted into digital signals utilizing, for example, a speech recognition digital signal processor (DSP) or equivalent mechanism. This DSP receives the analog signals of the voice inputs and converts them into phonemes (pieces of words with digital signals) using a recognizer, such as Hidden Markov Models (HMMs). Analog signals are split into digital signals that are discrete observations to which the HMMs of the recognizes are matched and hence the phonemes are created, stored, processed and matched to the other (AB data) phonemes to generate information requested by the user. Likewise, AB data inputs may be voice inputted using voice recognition. In addition, text-to-phoneme for subsequent matching with voice input queries, may be employed. Because voice recognition systems, voice operated systems and speak back systems are known, and well within the skill of the artisan, the present invention should now be perceived as encompassing the use of any known voice recognition, speech recognition, text-to-speech, text-to-phoneme and voice-to-phoneme systems and software that will provide the functions set forth herein.

One Person

One Record

Most address book software is too rigid to handle our complex lives, but AB is designed to duplicate the way humans think about contact information. To accomplish this, AB has a preferred embodiment primary tenet: every person has one and only one record in the database. That means that you never have to enter someone more than once to handle any situation (e.g., different homes at different times, or different legal names for the same person), and that every person a user knows gets his or her own record, (including minor children, husbands and wives, etc.).

Every person, no matter how old or young, deserves his or her own entry in one's address book. In most address book software, children are just notes added to either the mother or the father's record—even husbands and wives are often just "spouse:" fields, depending upon which one a user has entered first. But that doesn't leave room for real life, where both the husband and the wife might have work addresses, cell phones and emails, and where some children might live at home while others are off at college. Each person needs their own work address, home address, cell phone number, and multiple emails. If one wants to see a family all together, AB will do that too—search for any member of a family and the user can see a list of everyone in that family.

Each person's data record may contain an unlimited number of addresses. Most address book software gives a user a pre-defined limit on addresses—even if the user could enter lots of them it would be too complicated to access them all since they are stored with no structure. In AB, one can track any number of addresses by time and by relationship. Just add a new address, assign it to someone, and say when they're there (if one knows). That address can now be used by any other person in one's address book—just create a relationship between two people who share an address (say, father and daughter) and they will automatically share the same address, unless the user specifically changes one or the other's address (say, a divorced father who does not live full time with his daughter) in which case the user would link the daughter to her other parent's address for specified time periods and respond according to the timing of a query.

Creating Lists or Groups of Contacts

It is useful to be able to link several contacts together and refer to them as a unit. In AB, one can assign any number of categories to a contact record. For example, suppose a user is inviting people to a birthday party; she can assign each person the category "Joe's Birthday Party" and then see them all listed together (perhaps to send invitations or thank-you notes). Typically, to assign this category to each contact, she would have to individually choose each contact record and manually assign that category. However, there is an easier way. As she goes through her contact records in any way she'd lice, she'd just say "Birthday Party Add" on any contact record that she wants to add to the "Joe's Birthday Party" category. The "category add" instruction adds a contact record to a temporary list visible on the screen, so she can see how many people are currently invited (she can also see totals at the bottom of the list showing the total number of people in the list, total number of adults, of children, of men, of women, and other customizable information). This feature could add every record she is currently looking at (say she had said "Joe's children" and AB is showing her a list of all the children in Joe's family "Birthday Party Add All" adds all of these people to the list at once).

In AB, one can actually have multiple lists available simultaneously. Each list has a "Hold in List X" button or instruction so a user can add a person to any list at any time. This is an easy way to categorize one's contacts—a user only has to go through her entire contact list once and assign people to any list she'd like by voice, then at the end she can manipulate that list all at once (say; by assigning or unassigning a category, by emailing them to someone, etc.). She can also create a list from a category, or from some other type of information. In this manner, she may start with a current list and update it. Lists can be combined in various ways (e.g., eliminating duplicates, retaining only unique names, etc.). Lists may also be time-based, so the "Joe's Birthday Party" list from one year is unique and separate from the same-named list from a previous year, a comparison of the two lists shows people invited to both parties and people invited to one party but not the other.

By Design

AB is designed to track people throughout their lives. Over time, people are connected to others by information that either cannot be captured or cannot be used by traditional address book software. With its unlimited addresses and extra dimensions, AB can interpret one's queries using its knowledge of one's personal habits and retrieve the information one was actually looking for. Like a well-organized secretary, one can ask AB on Sunday night for "Joe smith phone" and it will not display the old college roommate's phone number and it will not show Joe Smith's work number. It will show Joe's family structure (in case his wife answers the phone), and if one finds out he's in Detroit for the week, one can easily add his itinerary to his record so that one can call him the next day without worrying that she'll be calling that hotel after he's left.

In traditional address book software all addresses are equal. If a user asks for all of the "A"s, she'll see every person whose name starts with "A". AB knows that's not the way a user usually thinks. One doesn't necessarily-want to see all of the contacts who start with A, or someone the user has not looked up in long time, or minor children, or some other criteria. In AB, the user will only see the "A"s that matter to the user. Unless a user wants to see all of the "A"s, in which case AB can easily do that as well.

With AB, a user doesn't have to worry about whether she originally said "Joe Smith" or "Smith, Joe" or "Dr. Smith" or "Joseph Smiff"—it will find his record no matter how she searches for it.

Historical Tracking

One side effect of using AB wilt be an unanticipated result: a complete list of every address a person has had since the user has been entering data for them. Instead of overwriting a person's old address with a new one, the user will have a record of when they moved and their old address. The user will know when a child starts college, when they get their first apartment, when two people get married, and on and on. The user may not use or need this information, but it will always be available, and if the need arises someday, for any reason, the user will have it.

Public vs. Private Information

AB is designed to allow a user to access and update contact information from the Internet. Therefore, that information is stored on a public server and can only be accessed by a user when the user enters the correct username and secure password. However, there is some information that is so personal that it should never leave a user's designated computer(s), e.g. one's home computer network. No matter how secure the public network is, one may not want the family's social security numbers to leave the home. In one preferred embodiment, AB provides for two different types of data to be stored in a contact record: personal data, which is stored on the server and is available through the Internet through a secure log-in, and private data, which is stored on the chosen or designated computer(s) or computer network(s) and never leaves it. When a user logs in to AB from any designated computer, e.g. in one's home computer network, the two types of data are mixed together seamlessly; when the user logs in from outside of the designated computer(s), then the user never even knows that the private data exists because it is secure and unavailable from that resource (computer, location or system). Likewise, read, instruct, edit, write in, add, delete and other features may be similarly or partially secured. This protects private data from security breaches, password stealing, and the hire.

Contact Types

Traditional address books have only one template for entering contact information, but no one template can possibly handle the different types of information that a user would prefer to enter for different types of contacts. For example, a family member has different data associated with them than does a professional (like a doctor or a lawyer), which in turn is different from a business (like a florist or a telephone company). AB allows for optimal unlimited different templates to be used with different types of entities. The standard ones should be enough for most people:

| | |
|---|---|
| Person | Family or friend or acquaintance |
| Professional | Part of a practice, like a doctor or a lawyer |
| Retail | A company with different employees |
| Educational | A school or university |
| Organizational | Work personnel, vendor lists, supplier lists, customer lists, sales leads list, a hobby, recreational, professional or sports organization list, common interest club, sport team, church group, scout troop, etc. |

Templates merely make data entry and presentation more useful to the user—they do not affect the underlying contact record. Therefore, in the present invention, one can present any contact using any template depending upon how one desires to use the contact information. For example, if one is looking up one's brother-in-law to find his home address, one would choose the Person template; if instead one wanted to purchase something from the store he works at, one might choose the Retail template instead.

No More Sorting!

Traditional address books sort contacts by their name—this makes sense if the user has to do the work of finding the right contact, since one can look through a sorted list much faster than a non-sorted list. But the question one always has to ask is which name is used to sort the records: first name, last name, business name, etc., and then the user has to guess which name she entered originally (e.g., Bill or William). Those problems are gone with AB, since records are only presented to the user after they have been filtered to just a few that match their criteria. In AB, whether a user types Bill or William, she'll see the same records. If she says a business name, she'll only see people associated with that business.

Event Recording

Addresses can be entered in AB without being attached to a person. One can give the address a name, and later one can associate that name with a person and a time. Because addresses have a time associated with them, one can use AB to track events or appointments. Just create an address with a name (for example, "add address graduation Main High School 555 Center St 07654 5/19 3-4 pm"), then link it to people who will be attending. It can even be recurring (like "add address PokerNight home every Wednesday 8 pm", assuming one has previously entered one's address and named it "home"). To see everyone invited to an event, just speak: "pokernight" and it will show a list of people currently linked to that address/time/event.

Import/Export Appointments

Contact Info

In AB, one can import addresses from a variety of other contact managers, and export the contact information to them as well (exporting will be limited to the small amount of information that each particular address book is capable of storing). If a user regularly exports certain contacts to her cell phone, she can make a category (say, "my cell phone") out of just those people she wants exported (since she most likely does not want every single contact she has downloaded into her phone—imagine how difficult it would be to find someone in a long list of names!). Then she can just export that category every time she wishes to update her cell phone.

Access Via Cell Phone or Email

In most preferred embodiments, one can access AB from one's cell phone or PDA—one doesn't need a complicated user interface to look someone up. One can speak to AB, or send AB an email or text message with the query and have it respond back with the results. Thus, a user's voice command email/text message would contain a special pass-phrase that tells AB that the user is permitted to access her database. It then looks up the contact the user is looking for and sends the results back to her the same way she sent the request. This is useful when she does not have full access to the web but only to a device that can utilize audio, or email or text message. AB knows about all of her phone numbers, cell numbers, email addresses and can import data from any of them. She can supply a different email address to be used by different people, so they each respond to her as a different person.

Send Emails to People Who Don't Use AB

If someone needs an address and the user wants to send it to that person, AB can email it to that person in a readable form. That person will not receive any private information that the user may have, and the user may select exactly which data will be sent.

Send Info to People Who Use AB

With AB, one can add one's contact information to other people's AB data. Private information will never be shared, but all other information can be inserted into their address books very easily. Additionally, one can specify that the shared contacts should be updated automatically whenever information is changed on one's computer. A user won't be using the same copy of the contact information as the person with whom it is shared, if desired. Thus, the present invention AB permits a user to modify information however she chooses, before sharing it. In some preferred embodiments, whenever a user changes that contact information (e.g., name changes, deletions, updates or corrections), other shared recipients may be notified of the change and will be able to automatically change it on their database, as they desire.

Public User IDs

With AB, if a user wishes to make certain parts of her address book available to others, the user can create a special user id and password that allows access to specific information in her database. For example, a user could create a family user id/password that could be given to anyone in the family who wants access to every family member's contact information. These controls may be voice inputs, text inputs or otherwise.

Stay Current with Other Programs

AB can interact with other programs that have contact information in them in order to update itself with new information. For example, if a user has entered new contacts into her cell phone, when it is connected to the user's computer (say, via Bluetooth), AB will communicate with the software program that recognizes that there are additions and will update itself Backup and Restoring Data Personal data may be stored securely and remotely on a user's web site and is backed up there. A user can also have a backup of this remote data on the designated (local) computer(s) as well. Private data is maintained on the designated local computer network, and is backed up for the user when AB is run locally. It backs this data up to another computer on the local network (if one is available) or another physical disk drive, to reduce the chances of lost data. At no time is private data ever sent outside the designated home computer network.

To summarize, the present invention thus provides all of the software to provide for the foregoing features and now that the invention has been thoroughly described above, the particular source code to accomplish these software actions and capabilities is well within the skills of the artisan. For example, "autocomplete" functions are available in Google's email program for mailing addresses. SpellCheck features are well known in word processing programs, such as Word and WordPerfect. Phoneme Check features have been taught in prior systems. However, none have been taught or suggested in the context of the connectivity matrix of the present invention, for example.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An address book system comprising:
at least one software module operable to:
store relationship data for each of a plurality of contacts in a database, wherein the plurality of contacts includes a first contact, a second contact, and a third contact; wherein the database comprises at least three access dimensions including contact-time access associated with each of the plurality of contacts;
deduce additional relationship data between the first contact and the second contact by using at least one relationship definition and the relationship data for the first and second contacts, wherein the additional relationship data is deduced based on a relationship between the first contact and the third contact and a relationship between the second contact and the third contact; and
provide a user interface that permits access to at least one of the plurality of contacts based on the additional relationship data.

2. The address book system of claim 1, wherein the at least one relationship definition comprises a familial relationship.

3. The address book system of claim 1, wherein the relationship data is stored in a phoneme format.

4. The address book system of claim 1, wherein the at least one software module is further operable to convert voice inputs to phoneme format and access the at least one of the plurality of contacts based on a match between at least a portion of the at least one of the plurality of contacts and the voice inputs.

5. The address book system of claim 1, wherein the at least three access dimensions of the database further includes contact access and contact-relationship access.

6. The address book system of claim 1, wherein the at least one software module is operable to return information regarding the at least one of the plurality of contacts based further on a time of access.

7. The address book system of claim 1, wherein the relationship data for the first contact includes a contact-time frame pair, and wherein the contact-time frame pair correlates a first phone number for the first contact at a first time of day and a second phone number for the first contact at a second time of day.

8. The address book system of claim 7, wherein the software module is further operable to receive a voice input request to access the at least one of the plurality of contacts, and wherein the at least one software module is further operable to compare the voice input request to the stored relationship data, and provide one of the first or second phone numbers based, at least in part, on a time of the voice input request.

9. A method for accessing an address book system, the method comprising:
storing, in an electronic database and by a processing device, relationship data and contact data for each of a plurality of contacts, including a first contact, a second contact, and a third contact, wherein the electronic database comprises at least three access dimensions including contact-time access associated with each of the plurality of contacts;
deducing, by the processing device, additional relationship data between the first contact and the second contact using at least one relationship definition and relationship data specifying a relationship between the first contact and a third contact and a relationship between the second contact and the third contact;
receiving, at the processing device, a voice request for a contact having the additional relationship data; and
in response to the voice request, providing at least a portion of the contact data for the first contact.

10. The method of claim 9, wherein said storing comprises storing at least a portion of the contact data in a phoneme format.

11. The method of claim 10, further comprising matching the voice request to at least a portion of the contact data in the phoneme format.

12. The method of claim 9, wherein the relationship definition comprises a familial relationship.

13. The method of claim 9, wherein the contact data includes first contact data corresponding to a first time of day and second contact data corresponding to a second time of day.

14. The method of claim 13, wherein said receiving occurs during the first time of day, and wherein said providing comprises providing the first contact data corresponding to the first time of day.

15. The method of claim 9, wherein the at least three access dimensions of the electronic database further includes contact access and contact-relationship access.

16. A non-transitory computer readable medium storing instructions that, upon execution by an apparatus, cause the apparatus to perform operations comprising:
- storing relationship data for each of a plurality of contacts in a database, wherein the plurality of contacts includes a first contact, a second contact, and a third contact, wherein the database comprises at least three access dimensions including contact-time access associated with each of the plurality of contacts;
- deducing additional relationship data between the first contact and the second contact by using at least one relationship definition and the relationship data for the first and second contacts, wherein the additional relationship data is deduced based on a relationship between the first contact and the third contact and a relationship between the second contact and the third contact; and
- providing a user interface that permits access to at least one of the plurality of contacts based on the additional relationship data.

17. The non-transitory computer readable medium of claim 16, wherein the at least one relationship definition comprises a familial relationship.

18. The non-transitory computer readable medium of claim 16, wherein the relationship data is stored in a phoneme format.

19. The non-transitory computer readable medium of claim 16, wherein the operations further comprise converting voice inputs to phoneme format and accessing the at least one of the plurality of contacts based on a match between at least a portion of the at least one of the plurality of contacts and the voice inputs.

20. The non-transitory computer readable medium of claim 16, wherein the at least three access dimensions of the database further includes contact access and contact-relationship access.

21. The non-transitory computer readable medium of claim 16, wherein the operations further comprise returning information regarding the at least one of the plurality of contacts based further on a time of access.

22. The non-transitory computer readable medium of claim 16, wherein the relationship data for the first contact includes a contact-time frame pair, and wherein the contact-time frame pair correlates a first phone number for the first contact at a first time of day and a second phone number for the first contact at a second time of day.

23. The non-transitory computer readable medium of claim 22, wherein the operations further comprise receiving a voice input request to access the at least one of the plurality of contacts, comparing the voice input request to the stored relationship data, and providing one of the first or second phone numbers based, at least in part, on a time of the voice input request.

* * * * *